United States Patent
Peppel et al.

[11] Patent Number: 5,944,134
[45] Date of Patent: Aug. 31, 1999

[54] ADJUSTABLE SNOWMOBILE TRACK SUSPENSION

[75] Inventors: Keith W. Peppel; Robert W. Przekwas; Edwin M. Monsrud, all of Roseau; Richard H. Bates, Jr., Badger, all of Minn.

[73] Assignee: Polaris Industries Inc., Minneapolis, Minn.

[21] Appl. No.: 08/896,486

[22] Filed: Jul. 18, 1997

Related U.S. Application Data

[63] Continuation of application No. 08/356,072, Dec. 14, 1994, Pat. No. 5,692,579.

[51] Int. Cl.$^6$ .................................................. B62M 27/02
[52] U.S. Cl. ........................... 180/193; 180/190; 180/9.5; 180/9.52; 305/127; 305/153
[58] Field of Search .................................. 180/182, 190, 180/193, 9.25, 9.5, 9.56, 9.52, 9.54; 305/127, 153

[56] References Cited

U.S. PATENT DOCUMENTS

| | | | |
|---|---|---|---|
| 3,613,811 | 10/1971 | Brandli | 180/193 |
| 3,727,709 | 4/1973 | Newman | 180/193 X |
| 3,773,126 | 11/1973 | Irvine | 180/193 X |
| 3,788,412 | 1/1974 | Vincent | 180/193 |
| 3,856,099 | 12/1974 | Bowers | 180/193 |
| 3,879,092 | 4/1975 | Rose | 305/24 |
| 3,913,693 | 10/1975 | Hale et al. | 180/193 |
| 3,944,005 | 3/1976 | Tomita | 180/193 |
| 3,966,181 | 6/1976 | Lessard | 267/58 |
| 4,133,400 | 1/1979 | Shiraishi | 180/193 |
| 4,222,453 | 9/1980 | Fixsen et al. | 180/193 |
| 4,518,056 | 5/1985 | Kobayashi | 180/193 |
| 5,033,572 | 7/1991 | Zulawski | 180/182 |
| 5,265,692 | 11/1993 | Mallette | 180/193 |
| 5,370,198 | 12/1994 | Karpik | 180/193 |
| 5,667,031 | 9/1997 | Karpik | 180/193 |

*Primary Examiner*—Daniel G. DePumpo
*Attorney, Agent, or Firm*—Gregory P. Kaihoi

[57] ABSTRACT

A suspension system mountable to the chassis of a snowmobile and about which an endless track is carried. The suspension includes a slide frame for engagement with a lower portion of the endless track and one or more springs for urging the slide frame downwardly away from the chassis. The suspension system also includes a downwardly angled suspension arm having an upper end pivotally mounted to the snowmobile chassis. The lower end of the arm is pivotally connected to the slide frame so as to permit limited longitudinal movement of the lower end of the arm with respect to the slide frame. An adjustable limit is provided for adjustably limiting the degree of longitudinal movement of the lower end of the arm with respect to the slide frame to adjustably control the range of orientations of the slide frame with respect to the snowmobile chassis.

11 Claims, 6 Drawing Sheets

ADJUSTABLE SNOWMOBILE TRACK SUSPENSION

This application is a continuation of Ser. No. 08/356,072 filed Dec. 14, 1994 now U.S. Pat. No. 5692579.

FIELD OF THE INVENTION

The invention relates to suspension systems for snowmobiles, and in particular to suspensions for snowmobile tracks.

BACKGROUND OF THE INVENTION

Performance characteristics of snowmobiles, including the comfort of the ride, depend upon a variety of systems and components, including the snowmobile suspension. Typically, a snowmobile suspension includes two systems, a front suspension system for the skis and a rear suspension system for the track.

The rear suspension of a snowmobile supports an endless track driven by the snowmobile engine to propel the machine. The track is supported beneath the vehicle chassis by a suspension that is designed to provide a comfortable ride and to help absorb the shock of the snowmobile crossing uneven terrain. Most modern snowmobiles utilize a slide rail suspension which incorporates a pair of slide rails along with several idler wheels to support the track in its configuration. The slide rails typically are suspended beneath the chassis by a pair of suspension arms, each arm being attached at its upper end to the chassis of the snowmobile, and at its lower end to the slide rails. The mechanical linkage of the slide rails to the suspension arms and to the snowmobile chassis typically is provided with springs and one or more (often two) shock absorbers, the springs being loaded to urge the slide rails downwardly away from the snowmobile chassis, and the shocks providing dampening forces for ride comfort.

A variety of configurations of suspension arms, springs, shocks, and shock rods have been utilized to alter the characteristics and feel of the ride given by a particular suspension system. U.S. Pat. No. 5,265,692 (Mallette) shows a snowmobile track suspension having a pair of generally parallel suspension arms connecting the slide rails to the snowmobile chassis. The lower end of the rear suspension arm has a pivot mount that is movable longitudinally of the slide frame. When this pivot is located at its forward most portion of longitudinal movement (i.e., at the forward end of a longitudinal slot), the suspension arms form a parallelogram with the snowmobile chassis and the slide rails so that upward movement of the front suspension arm is transmitted through the slide rails to the rear suspension arm, causing the slide rails to move upward in an orientation that is generally parallel to the snowmobile chassis. Thus, the front end of the slide rails cannot move higher than the back end of the slide rails. The longitudinal slot into which the lower end of the rear suspension arm is pivotally mounted, however, permits the back end of these slide rails to move higher than the front end of the rails. It is said in the Mallette patent that permitting the back end of the slide rails to move upwardly produces a comfortable ride as bumps in the terrain are encountered.

Applicant has found, however, that the Mallette suspension, like many other suspensions, may seem optimized for certain conditions, but performs less optimally in other conditions. For example, in relatively deep powder, it may be particularly desirable to permit the front end of the slide rail suspension to move higher than the rear of the suspension, making it somewhat easier for the snowmobile track to plane out or rise above the powdery snow. Conversely, the amount that the back end of the slide rails are permitted to rise above the front end of the slide rails (or, to say it a different way, the amount that the snowmobile is permitted to "rock backwards" on the suspension) has an effect on the amount of weight transfer from the front of the machine to the rear of the machine, which affects acceleration and the amount of the weight on the skis (which affects steerability).

In light of the varying characteristics that can be built into a suspension system, a variety of competing suspension systems have been made commercially available, and different types of suspension systems commonly are employed on different types of machines, depending upon their primary usage (e.g., racing, touring, etc.).

SUMMARY OF THE INVENTION

The invention provides a suspension system for a snowmobile track that is adjustable by the rider to match the riding conditions and performance characteristics desired. The system includes a slide frame for engagement with a lower portion of the snowmobile track, and a pair of suspension arms mounted to the snowmobile chassis and the slide frame. Conventional springs are provided for urging the slide frame downwardly away from the chassis. The front suspension arm typically has pivotal connections at both ends, one end connected to the snowmobile chassis and the other end connected to the slide frame. The rear suspension arm is pivotally connected to the snowmobile chassis at its upper end, and includes a pivotal connection at its lower end to the slide frame which permits longitudinal movement of the lower end of this rear suspension arm with respect to the slide frame. Adjustable limit means is provided for adjustably limiting the degree of longitudinal movement of the lower end of the rear arm with respect to the slide frame. Thus, the adjustable limit means can be selectively adjusted by the rider to vary the performance and ride characteristics of the suspension. Preferably the adjustable limit means includes an adjustable limit at either the forward end of longitudinal movement of the suspension arm, or an adjustable limit at the rearward end of travel of the rear suspension arm. In one embodiment, both the forward limit and the rearward limit are adjustable.

In one particularly preferred embodiment, the adjustable limit means comprises an adjuster block eccentrically mounted to the slide frame, the adjuster block being selectively rotatable to one of several positions to selectively vary the limit on movement of the lower end of the rear arm with respect to the slide frame.

DETAILED DESCRIPTION OF THE INVENTION

Figure 1:
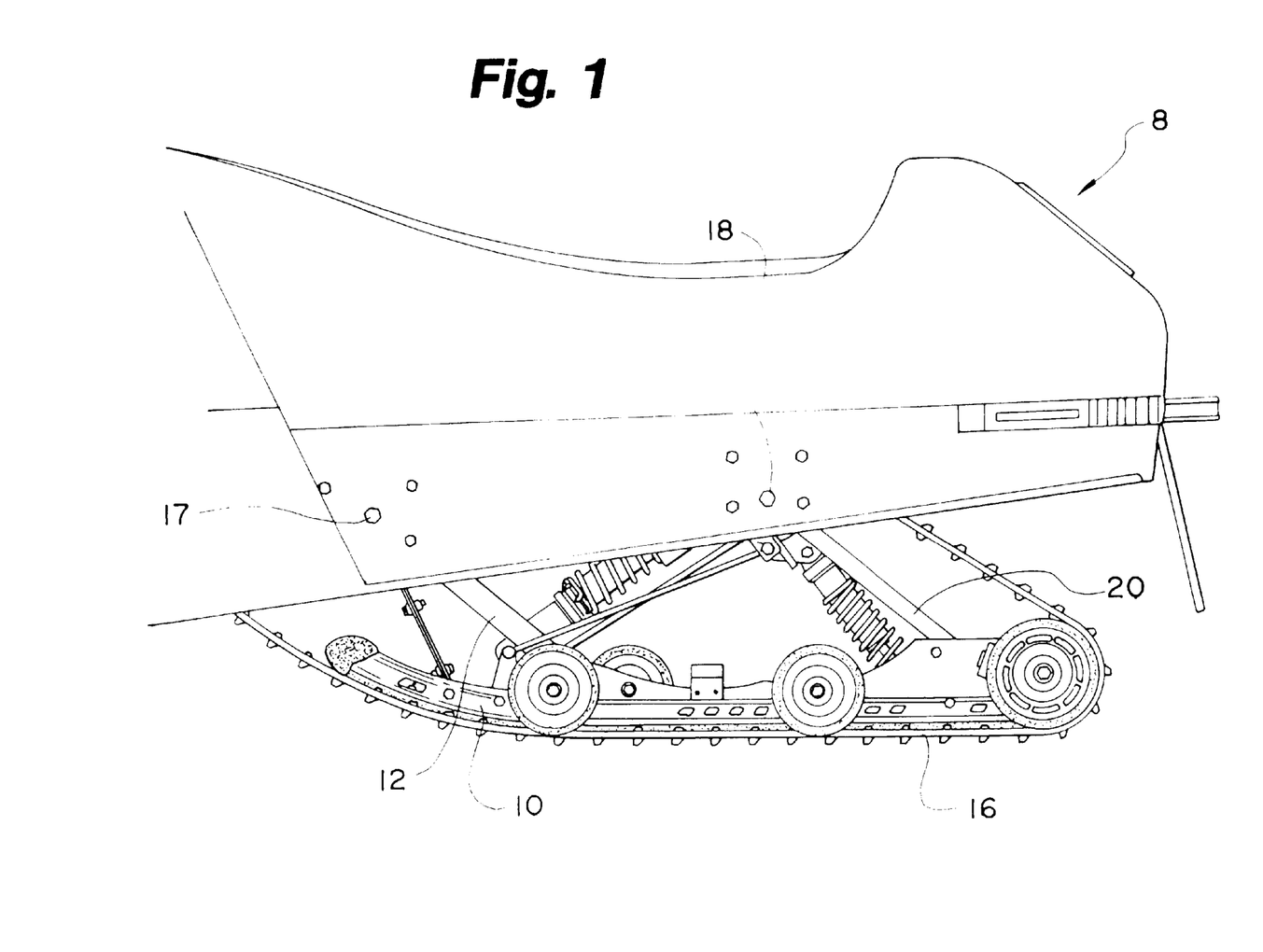
FIG. 1 is a side view of the rear portion of a snowmobile suspension of the invention.

FIG. 1 depicts the rear portion of a snowmobile 8 having a rear suspension system for supporting the rear portion of the machine and for defining the path of the track 16 which propels the machine across the snow. Although the invention can be utilized in connection with a variety of rear suspension configurations, the invention will be described in the context of a particular preferred rear suspension illustrated in the drawings. Such a suspension includes a front suspension arm 12 and a rear suspension arm 20, each such arm extending downwardly and rearwardly from pivotal connections (17 and 18, respectively) to the snowmobile frame or chassis (often referred to as the "tunnel"). The lower end of each such-arm is secured, either directly or indirectly, to the suspension rails 10, beneath which the track slides.

Figure 2:
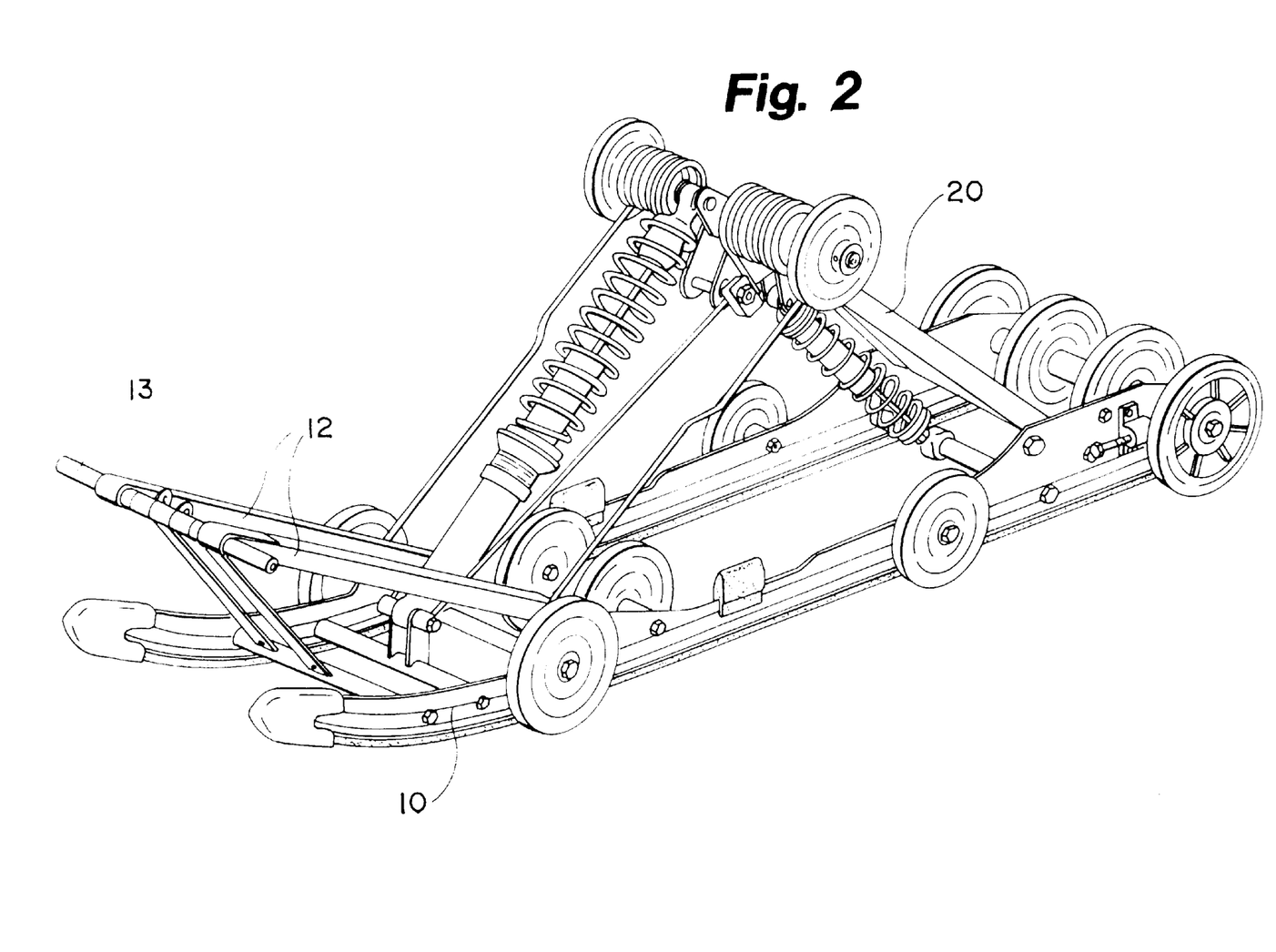
FIG. 2 is a perspective view of a rear suspension system of the invention.
Figure 3:
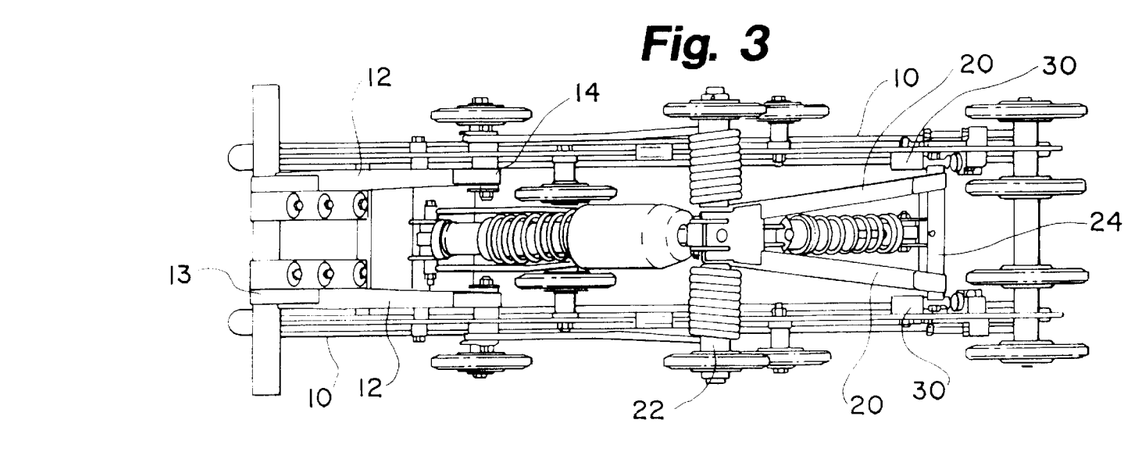
FIG. 3 is a top view of the suspension shown in FIG. 2.
Figure 4:
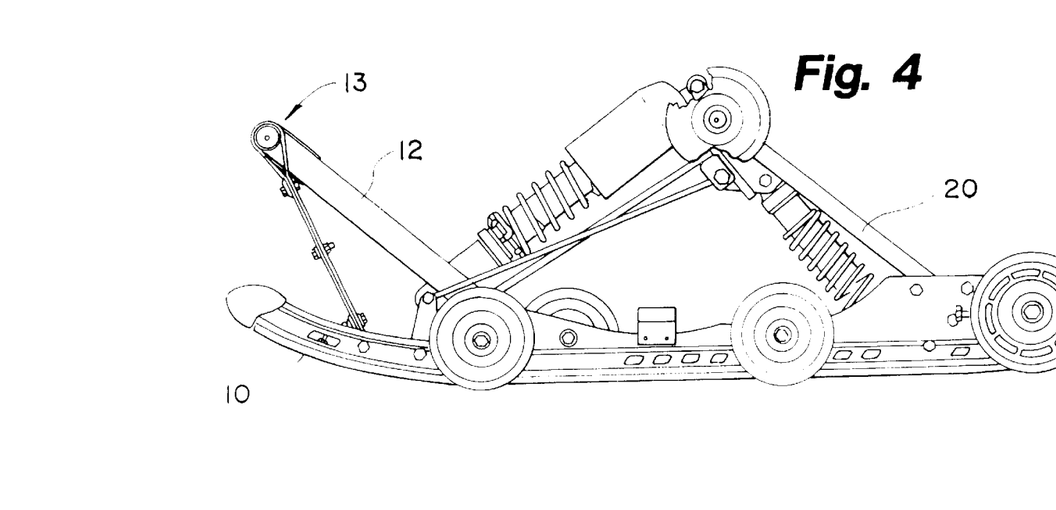
FIG. 4 is a side elevational view of the suspension shown in FIG. 2.

As the snowmobile tunnel obscures much of the mechanical linkages in the rear suspension, FIGS. 2–4 depict the suspension (absent the track) removed from the machine. Springs and shock absorbers are typically provided to urge the slide rails 10 down and away from the snowmobile tunnel, the springs and shocks acting to control the relative movement of the suspension with respect to the tunnel as the snowmobile moves over terrain of varying contours. The relative lengths and orientations of the suspension arms 12 and 20 also control the movement and orientation of the suspension as it is compressed upwardly toward the tunnel.

Figure 5:
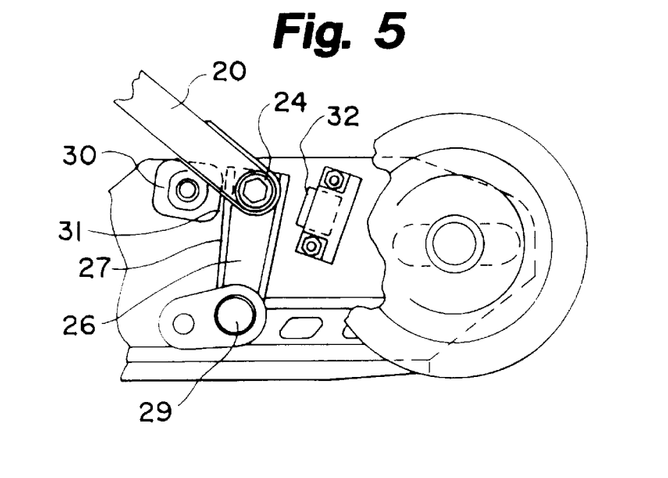
FIG. 5 is a broken-away view of the adjustable stop of the invention.
Figure 7:
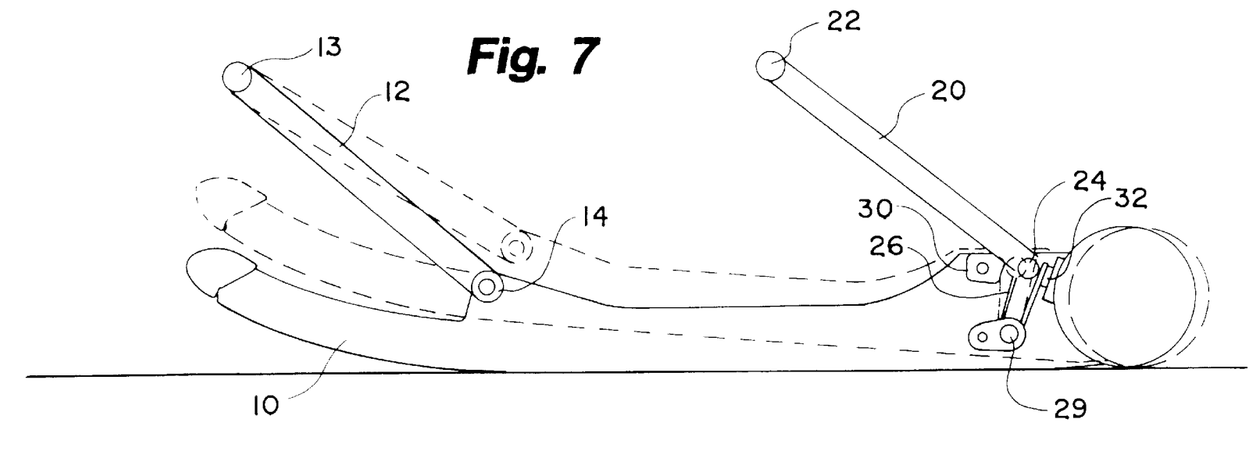
FIG. 7 is a somewhat schematic view of the motion of a suspension slide rail from a first position where the rear suspension arm engages a rear stop and a second position where the rear suspension arm engages an adjustable front stop.

FIGS. 5 and 7 depict a preferred embodiment for the rear suspension arm mechanism. The upper end 22 of the rear arm 20 is pivotally connected to the snowmobile tunnel. The lower end of the arm 20 includes a pivot point 24 connecting to a lower pivot arm 26, which in turn is pivotally connected to the slide rail 10. As is depicted in FIG. 7, the linkage of the arm 20 with the lower pivot arm 26 permits the front of the rails to rise substantially independently of the rear portion of suspension rails. During this independent movement of the front portion of the suspension, the lower pivot arm pivots from the rearward position shown in solid lines in FIG. 7 to the forward position depicted in broken lines. At the point which the front surface 27 of the lower pivot arm 26 engages the front adjuster block 30, further independent upward movement of the front end of the suspension is prevented. That is, further upward movement of the front of the suspension rails 10 is mechanically linked through the adjuster block 30 to the rear suspension arm 20, causing upward movement of the rear of the suspension (the rate of upward movement of the rear of the suspension may or may not be equal to the rate of movement of the front of the suspension, depending on the specific geometric configuration of the system).

The degree of independent movement afforded to the front of the suspension rails 10 is dependent on the distance between the rear stop 32 and the front adjuster block 30. The rear surface 31 of the front adjuster block 30 thus provides a limit on the relative forward movement of the lower end of the suspension arm 20 with respect to the slide rail 10. The invention provides variability to the position of this limit, thereby giving the rider some control over the performance characteristics of the suspension.

Figure 6:
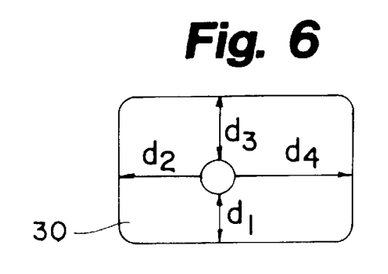
FIG. 6 is a side view of a preferred adjuster block of the invention.

In the embodiment of the invention depicted in FIGS. 5–7, the variability of the limit is accomplished by using a rectangular adjuster block 30. FIG. 6 illustrates the distances ($d_1$–$d_4$) between the central mounting hole and the four surfaces of the block; by rotating the block to select one of the surfaces, the position of the limit with respect to the lower end of the suspension arm 20 can be controlled. In FIG. 5, the block is adjusted to its thickest setting; in this setting, the front end of the suspension is permitted relatively less upward movement before the rear of the suspension begins to move upwardly along with the front. If the block were rotated to its thinnest position (i.e., $d_1$ of FIG. 6), relatively more upward movement of the front of the slide rails is permitted. Thus, the rider can adjust the performance characteristics depending upon the snow conditions and ride characteristics desired. For example, in deeper, powdery snow, it may be desired to permit the front to rise more (assisting the snowmobile in tending to ride up on top of the snow, rather than plowing through it).

Figure 8:
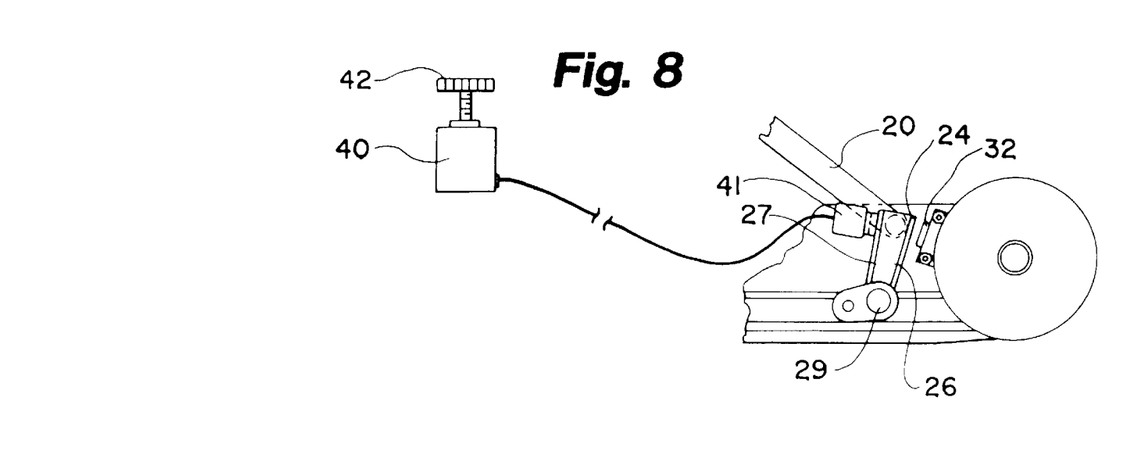
FIG. 8 is a view similar to FIG. 5 showing somewhat schematically the use of a hydraulic adjustment mechanism.

Other mechanisms may similarly be used to provide adjustability to the limit on the relative longitudinal movement of the lower end of the suspension arm 20 with respect to the slide rail. For example, FIG. 8 depicts, in somewhat diagrammatic fashion, the use of a hydraulic master cylinder 40, which can be conveniently located near the snowmobile controls, and a slave cylinder 41. By adjusting the master cylinder (as by turning the knob 42), the position of the rearward surface of the slave cylinder 41 can be correspondingly adjusted to change the location of the limit, thereby providing the desired ride characteristics. Though not illustrated, a similar hydraulically adjustable limit could also be provided as the rear limit on relative longitudinal movement of the lower end of the suspension arm 20 with respect to the slide rail. In addition to the adjuster block and hydraulic system, persons of average skill in the art will recognize that other equivalent mechanical stops and/or linkages may be provided that perform the function of providing adjustable limits on the relative longitudinal movement of the lower end of the suspension arm with respect to the slide rail.

Figure 9:
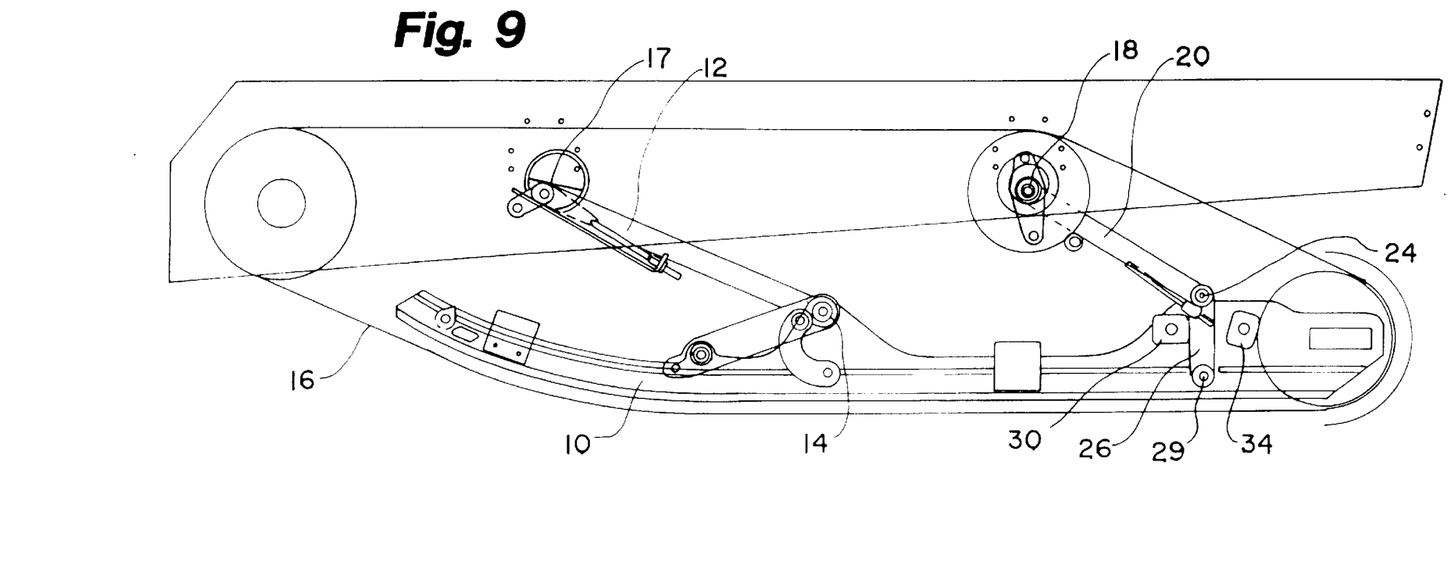
FIG. 9 shows another embodiment having both front and rear adjustable stops.

FIG. 9 depicts a somewhat different embodiment of the invention, where both front 30 and rear 34 adjuster blocks; the rear adjuster block functions analogously to the front adjuster block, limiting the independent upward movement of the rear of the suspension with respect to the front of the suspension. A hydraulic mechanism similar to that depicted in FIG. 8 could also be used for adjustment of the rear limit. The position and elasticity of the rear limit is valuable, for example, in maintaining proper track tension. In the suspension shown in the drawings, under some circumstances if the rear of the suspension is permitted to rise independently of the front beyond a certain point, the track may become undesirably loose, resulting in slippage of the track with respect to its drive sprocket (i.e., "ratcheting").

Figure 10:
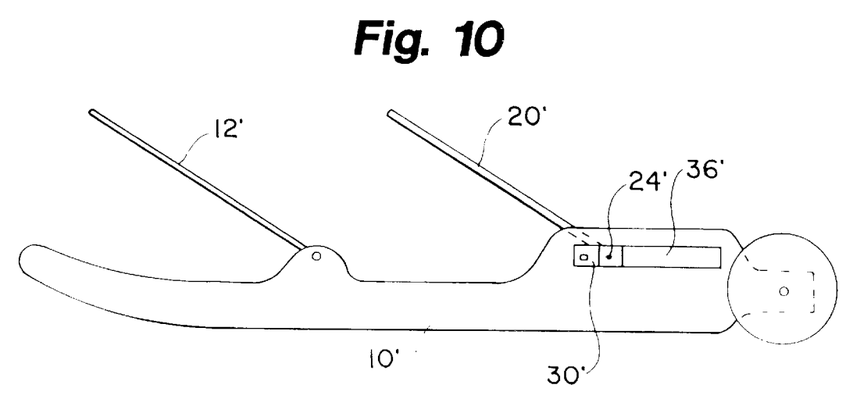
FIG. 10 shows another type of suspension on which the invention may be utilized.

FIG. 10 depicts use of the invention in conjunction with a suspension of the type shown in U.S. Pat. No. 5,265,692 (Mallette) (incorporated herein by reference), where the lower end 24' of the rear suspension arm 20' is permitted to travel longitudinally in a slot 36' in the suspension rail 10'. The limit on such forward longitudinal movement can be adjustably controlled by use of an adjustment means of the present invention (such as the adjuster block 30', a hydraulic adjustment mechanism, or other adjustable mechanical connections or limits) on the Mallette-type suspension.

Figure 11:
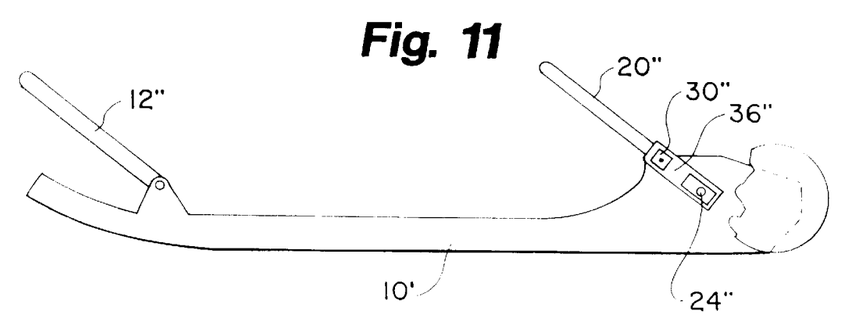
FIG. 11 shows yet another type of suspension on which the invention may be utilized.

FIG. 11 depicts yet another variation of the type of suspension on which the invention may be utilized. This suspension is similar to the Mallette suspension, except that the slot 36" is angled upwardly; such a suspension, depicted in U.S. Pat. No. 5,370,198, is commercially available from FAST Incorporated of Ely, Minn., under the trademark M-10. Again, the mechanism of the invention can be added to the M-10 type suspension by positioning the adjustable limit (such as the adjuster block 30") at one or both ends of the upwardly angled slot 36".

In a particularly preferred embodiment the limit on relative longitudinal movement of the lower end of the suspension arm 20 with respect to the slide rail may be constricted to provide resilience. For example, the adjuster block depicted in the drawings preferably is made from an elastomeric material such as a polyurethane. A polyurethane resin obtained commercially from Dow under the trademark PELLATHANE 2102-85A has worked well; it has a hardness of about 85 Shore A. Other equivalent materials would also work well, including materials that are slightly harder.

Other methods of providing resiliency may be utilized, such as utilizing coil compression springs, etc. Resiliency in the adjustable limit assists in absorbing dynamic shock loads encountered by the suspension, and may provide a rising compression rate that can further be used to control the amount of longitudinal forward movement of the lower end of the suspension arm 20 and, therefore, the relative movement of the front of the slide rail with respect to the rear of the slide rail. Thus, for example, as the snowmobile encounters a severe bump at a relatively high speed, the front of the suspension rail will initially begin to rise (as shown in FIG. 7) until the lower pivot arm 26 (or equivalent structural member in analogous suspensions) encounters the adjuster block 30 (or equivalent structure). At this point, if the adjuster block is made of a rigid material, further independent upward movement of the front of the suspension is prevented—the rear of the suspension begins to also move upward (as described above). If the adjuster block (or equivalent structure) is somewhat resilient, however, the resiliency will allow the front to independently move somewhat higher when severe compression forces are encountered. Thus, when the suspension hits a bump particularly hard, the adjuster block will compress further than it would if the same bump were encountered less severely, thereby helping to absorb dynamic shock loads and providing a rising compression rate that gives the front end of the suspension a limited greater degree of independent motion under such loads with respect to the rear of the suspension. In a sense, therefore, the resilient adjustable limit of the suspension is moveable under dynamic loading forces, such movement being in response to and in general proportion to the magnitude of forces causing longitudinal movement of the lower end of the rear arm with respect to the slide frame.

While a preferred embodiment of the present invention has been described, it should be understood that various changes, adaptations and modifications may be made therein without departing from the spirit of the invention and the scope of the appended claims.

What is claimed is:

1. A method of adjusting the performance characteristics of a snowmobile suspension system comprising the steps of:
providing a snowmobile having a suspension system mountable to the chassis of the snowmobile and about which an endless track is carried, the suspension system including a slide frame for engagement with a lower portion of the endless track, a downwardly angled suspension arm having an upper end pivotally mounted to the snowmobile chassis, a pivotal connector pivotally connecting the lower end of the arm to the slide frame and permitting limited movement of the lower end of the arm with respect to the slide frame from a first position, corresponding to a first orientation of the slide frame with respect to the snowmobile chassis, to a second position corresponding to a second orientation of the slide frame with respect to the snowmobile chassis, such first and second positions defining a range of orientations of the slide frame with respect to the snowmobile chassis, and an adjustable limit adjustably limiting the range of such orientations of the slide frame with respect to the snowmobile chassis;

adjusting the adjustable limit to a first position providing a corresponding set of performance characteristics;

riding the snowmobile with the adjustable limit in its first position;

adjusting the limit to a second position providing a corresponding second set of performance characteristics; and riding the snowmobile with the adjustable limit in its second position.

2. A method of adjusting the performance of a snowmobile track suspension system mounted to a chassis of a snowmobile, comprising:

providing a suspension system having a slide frame for engagement with a lower portion of a track, a spring urging the slide frame downwardly away from the chassis, a downwardly angled suspension arm having an upper end pivotally mounted to the snowmobile chassis and a lower end mounted to a movable pivot carried by the slide frame, and an adjustable limit positioned to selectively limit movement of the movable pivot to a defined range of movement corresponding to a range of orientations of the slide frame with respect to the snowmobile chassis;

operating the snowmobile with the adjustable limit positioned at a first position corresponding to a first range of orientations of the slide frame with respect to the snowmobile chassis;

adjusting the pivot limit to a second position corresponding to a second range of orientations of the slide frame with respect to the snowmobile chassis; and operating the snowmobile with the adjustable pivot limit positioned at the second position.

3. The method of claim 2 wherein the adjustable limit is carried by the slide frame.

4. The method of claim 3 wherein the slide frame includes a pair of slide rails, the adjustable limit being carried by at least one of the slide rails.

5. The method of claim 2 wherein the adjustable limit comprises an adjustment block, the step of adjusting the limit comprising rotating the adjustment block.

6. The method of claim 5 wherein the slide frame includes a pair of slide rails, the adjustment block being carried by at least one of the slide rails.

7. A method of adjusting the performance characteristics of a snowmobile suspension system comprising the steps of:

providing a snowmobile having a chassis and a suspension system mounted to the chassis and about which an endless track is carried, the suspension system including a slide frame, having a front and a rear, for engagement with a lower portion of the endless track, a downwardly angled suspension arm mounted to the snowmobile chassis and to the slide frame, the suspension arm providing a range of upward and downward movement of the rear of the slide frame independently of the front of the slide frame, and an adjustable stop positioned with respect to the slide frame and the suspension arm to limit the range of independent upward and downward movement of the rear of the suspension with respect to the front of the suspension;

adjusting the adjustable stop to a first position providing a corresponding first range of movement of the rear of the slide frame independently of the front of the slide frame, and, therefore, providing a first set of performance characteristics;

riding the snowmobile with the adjustable stop in its first position;

adjusting the stop to a second position providing a corresponding second range of movement of the rear of the slide frame independently of the front of the slide frame, and, therefore, providing a corresponding second set of performance characteristics; and riding the snowmobile with the stop in its second position.

8. The method of claim 7 wherein the adjustable limit is carried by the slide frame.

9. The method of claim 8 wherein the slide frame includes a pair of slide rails, the adjustable limit being carried by at least one of the slide rails.

10. The method of claim 7 wherein the adjustable limit comprises an adjustment block, the step of adjusting the limit comprising rotating the adjustment block.

11. The method of claim 10 wherein the slide frame includes a pair of slide rails, the adjustment block being carried by at least one of the slide rails.

* * * * *

UNITED STATES PATENT AND TRADEMARK OFFICE
CERTIFICATE OF CORRECTION

PATENT NO. : 5,944,134

DATED : August 31, 1999

INVENTOR(S) : Peppel et al.

It is certified that error appears in the above-identified patent and that said Letters Patent are hereby corrected as shown below:

Column 8, line 5, replace "limit" with --stop--.
Column 8, line 8, replace "limit" with --stop--.
Column 8, line 10, replace "limit" with --stop--.
Column 8, line 12 replace "limit" with --stop--.

Signed and Sealed this

Third Day of April, 2001

Attest:

NICHOLAS P. GODICI

*Attesting Officer*     *Acting Director of the United States Patent and Trademark Office*